US007325192B1

United States Patent
Bialek et al.

(10) Patent No.: US 7,325,192 B1
(45) Date of Patent: Jan. 29, 2008

(54) METHOD OF ASSEMBLING CONTENT FROM CONTENT PROVIDERS

(75) Inventors: Michael J Bialek, Corvallis, OR (US); Li Feng, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1780 days.

(21) Appl. No.: 09/627,535

(22) Filed: Jul. 28, 2000

(51) Int. Cl.
G06F 17/00 (2006.01)
G06F 3/00 (2006.01)

(52) U.S. Cl. .................. 715/530; 715/505; 715/507; 715/517; 715/733; 715/738; 715/747

(58) Field of Classification Search ............... 715/530, 715/513; 707/1, 10, 102; 709/203, 218, 709/229; 345/733, 738, 744, 745, 747
See application file for complete search history.

(56) References Cited

U.S. PATENT DOCUMENTS

| | | | |
|---|---|---|---|
| 6,038,601 A * | 3/2000 | Lambert et al. | 709/226 |
| 6,377,963 B1 * | 4/2002 | Walker et al. | 715/530 |
| 6,434,621 B1 * | 8/2002 | Pezzillo et al. | 709/231 |
| 6,460,036 B1 * | 10/2002 | Herz | 707/10 |
| 6,535,921 B2 * | 3/2003 | Hirasawa et al. | 709/232 |
| 6,594,682 B2 * | 7/2003 | Peterson et al. | 709/219 |
| 6,632,248 B1 * | 10/2003 | Isaac et al. | 715/501.1 |

OTHER PUBLICATIONS

Hewlett-Packard, HP Instant Delivery [Online]. Available: http://www.instant-delivery.com/Home/ [Jun. 14, 2000].
Vignette, StoryServer 4.0 Library [Online]. Available: http://www.vignette.com/CDA/Site/0,2097,1-1-110-224-230-237,FF.html [Jun. 12, 2000].
Vignette, Syndication Server 5.0 Library [Online]. Available: www.vignette.com/CDA/Site/0,2097,1-1-110-224-651-1093,FF.html [Jun. 12, 2000].
Vignette, Development Center 5.0 Library [Online]. Available: http://www.vignette.com/CDA/Site/0,2097,1-1-110-224-652-1094,FF.html [Jun. 12, 2000].
Vignette, Terms and Conditions [Online]. Available: http://www.vignette.com/CDA/WSR/terms/ [Jun. 12, 2000].
Vignette, V/5 eBusiness Platform Architecture [Online]. http://222.vignette.com/CDA/Site/0,2097,1-1-731-1191-733-1196,FF.html [undated].
VIZ Communications, Inc., Viz new features [Online]. Available: http://www.viz.com/ [Jun. 14, 2000].
VIZ INternet [Online]. Available: http://www.instant-delivery.com?Publication/Publication.asp?HpPubID=1640&RefType=go [Jun. 14, 2000].
VIZ, Battle Angel Alita [Online]. Available: http://www.viz.com/products/series/alita/index.html [Jun. 14, 2000].

* cited by examiner

Primary Examiner—William Bashore
Assistant Examiner—Chau Nguyen
(74) Attorney, Agent, or Firm—Raymond A. Jenski

(57) ABSTRACT

An automated document delivery service acquires content from content providers publishing on different schedules and using different URLs to define the path to their web sites. A rule based process of URL generation enables the use of a limited number of resource locator templates and a table of rules to access the web sites and download content of a large number of content providers.

15 Claims, 7 Drawing Sheets

Fig. 6-1

| { Syndicator Base URL } | { Syndicator Subdir } | { Path Identifier } | { Date } | { Syndicator Identifier } | { Syndicator Suffix } |
|---|---|---|---|---|---|
| 601 | 603 | 605 | 607 | 609 | 611 |
| | | | | | 613 |

Fig. 6-2

| { Syndicator Base URL } | { Syndicator Subdir } | { Path Identifier } | { Date } | { Syndicator Identifier } | { Syndicator Suffix } |
|---|---|---|---|---|---|
| 1. tms.tribune.com/Syndicate/bn3qct2/ | comment/ | ctnzq/ | 20000514 | ctnzq-a | .tif |
| 2. amuniversal.com/Login/ | comic%20strips | Booddocks/bo | 00607 | [-] | .tif |
| ... n | ... | ... | | | |

METHOD OF ASSEMBLING CONTENT FROM CONTENT PROVIDERS

BACKGROUND

The present invention generally relates to a method of assembling content from several content providers into a single document and more particularly relates to a method of automatically creating compatible resource locators for content providers offering content on a network in order to access the content.

Composition of materials for a document has routinely been a manual effort. Decisions have to be made regarding content and layout as well as content currency. The content, itself, must then be obtained from the author, usually through a content provider such as a distributor or syndicator. Once it is obtained, the content is manually assembled and published or otherwise delivered to the consumer or subscriber. This technique is well known for newspapers such as the New York Times and the Washington Post, magazines such as Newsweek and Sports Illustrated, and thousands of other lesser known publications. While these thousands of publications cover a wide range of interests, from news to sports to fashion to model rocketry, they have one thing in common: they are intended to be read by a mass market. Conventionally, it is not economically viable for such publications to have a small readership, due at least in part to high marketing, production and distribution costs. In fact, many of today's publications are funded to a very large extent by the advertising contained within them. These advertisers are attracted to publications that can consistently deliver a large, reliable audience of consumers that will be exposed to their advertising.

While this mass market publication model has worked well for hundreds of years, it is not without its problems. One such problem is that a typical reader of a publication has a wide variety of interests, and no single mass market publication will be able to satisfy all these interests. For example, a reader who is interested in international news, golf, fly fishing, genealogy, and computers may have to subscribe to several different publications to satisfy these interests. Of course, since these publications are intended for a mass market, they will also contain a significant amount of material that the reader is not interested in and will not read. It goes without saying that if there is a significant amount of material a reader isn't reading, there is a significant amount of advertising the reader isn't reading either—as well as a significant amount of paper that is wasted. Advertisers know this, and agree to pay considerably less to a mass market magazine or newspaper per 1000 exposures to their ad than they would pay to a direct-mail generator that can provide a more specific guarantee that the people exposed to their ad are of a demographic group that will be much more likely to read their ad and be interested in it.

In addition, it is neither cost-effective nor time effective for most readers to subscribe to and/or read a large number of publications. Generally, the typical reader will only subscribe to a few publications that are of the most interest to them. The reduced readership level of the publications the typical reader chooses not to subscribe to, even though he would be interested in at least some of the editorial and advertising content contained inside, means that the publication receives less subscription and advertising revenue than they otherwise would. If many other readers make the same decision, the continued health of the publication may be in jeopardy, and the publication may be forced to go out of business. In fact, many publications do go out of business yearly for failing to attract a sustaining number of advertisers and readers—even if there are a large number of readers that would be interested in reading their publication, and a corresponding number of advertisers anxious to have these readers exposed to their ads. In general, publications that fail to attract a substantial mass market of people willing to pay for and/or read them cease publication. This is a shame, since many of these publications would enrich the diversity of information available to all readers, and would provide an avenue for lesser known writers and artists to practice their wares.

In more recent years, a new type of publication has emerged: the electronic publication. Readers of these publications typically sign onto a network, such as the Internet, via their computer, and read the publications online. Some of these publications, such as CNN.com and pointcast.com, allow users to state personal preferences on what type of material they want to read. Often, these personalized electronic publications include advertising, usually in the form of a banner ad that is placed on the top of the screen.

While these electronic publications have been an interesting development in the distribution of information, they still represent a tiny fraction of the information that is published. Many readers of these electronic publications complain that they are very difficult to read, especially for long periods of time. While it might be convenient for a reader to sign onto the Internet to look at the CNN.com web site for a brief summary of late breaking news, this reader would most likely only spend a few minutes at the site, and would likely still subscribe to the more traditional print media such as Newsweek or the Washington Post. They would also likely spend significantly more time reading the more traditional printed publication than they would spend reading the electronic publication, and correspondingly, spend more time being exposed to the ads in the traditional printed publication.

The aversion to lengthy viewing of electronic terminals and the waste, in a least consumer's time and materials, has been overcome by document delivery services such as "Instant Delivery" offered by Hewlett-Packard Company at http://www.instant-delivery.com and described, in part, in U.S. patent application Ser. No. 09/325,040 filed on Jun. 7, 1999 on behalf of Jon A. Brewster et al.

Conventionally, assembly of materials for such electronic delivery has been a manual process consuming a significant amount of human energy in what could be considered a repetitive job requiring human supervision. Moreover, as additional content providers offered material for electronically mediated publication, the task has become even more significant.

Accordingly, there is a need for a process that automates the activity of obtaining content that is of a specified variety for each subscriber, individually, from a plurality of content providers. After the content is believed to be received its existence should be automatically verified before the content is assembled into a document for delivery to the subscriber.

SUMMARY OF THE INVENTION

Content from content providers, which have the content available on a network, is assembled for delivery to a subscriber's terminal by obtaining a subscriber's content definition. A locator template is defined, the locator template having a plurality of parameter slots and being compatible with a resource locator of a content provider having content meeting the content definition. Parameter values are recalled and inserted in the locator template parameter slots to create a provider resource locator. The provider resource locator is transmitted on the network and content is received from the content provider in response to the transmission of the provider resource locator. At least the received content is assembled for delivery to the subscriber's terminal.

BRIEF DESCRIPTION OF THE DRAWINGS

FIG. 6-1 is a diagram of a resource locator template that may be employed in the present invention.

FIG. 6-2 is a matrix of parameter values for the parameter value slots of FIG. 6-1.

DETAILED DESCRIPTION OF THE PREFERRED EMBODIMENT

Figure 1:
FIG. 1 is a representation of a web page for a service provider which may employ the present invention.

Electronically mediated document publication services such as the aforementioned "Instant Delivery" offered by Hewlett-Packard Company typically have a webpage available on a network, like the Internet, as shown in FIG. 1. Such a webpage offers the viewer a chance to subscribe to an automatic document delivery service in which the subscriber selects content (illustrated, in part, at 101) to be aggregated into a document template and delivered (illustrated at 103) to the subscriber's printer or terminal. The entity providing a document delivery service of this sort is termed herein as a subscription provider.

Figure 2:
FIG. 2 is a representation of a web page for a service provider which may employ the present invention and which offers a subscriber a selection of features to be assembled into a document.

It can be seen in the exemplary webpage of FIG. 2, that content that populates the document template can be chosen from numerous content providers. In the example of FIG. 2, several comic strips 201 drawn by different artists and offered by several syndicators are made available for the subscriber to select as part of the content populating his personalized document. Similar selection pages are available for news articles, sports, entertainment and the like. Once the selections have been made in each of the subscriber's choice of categories and conveyed to a controlling function at a website server, a document server, for saving as part of the subscriber's profile, the website schedules and delivers the selected content in a document to the user. Typically, the document is of the form of pages printed on the subscriber's printer or similar printing device. Delivery to the subscriber can also be made to other terminal varieties such as a video screen, a PDA, a cellular telephone display, or equivalent visible, audible, or tactile human interface terminals.

Figure 3:
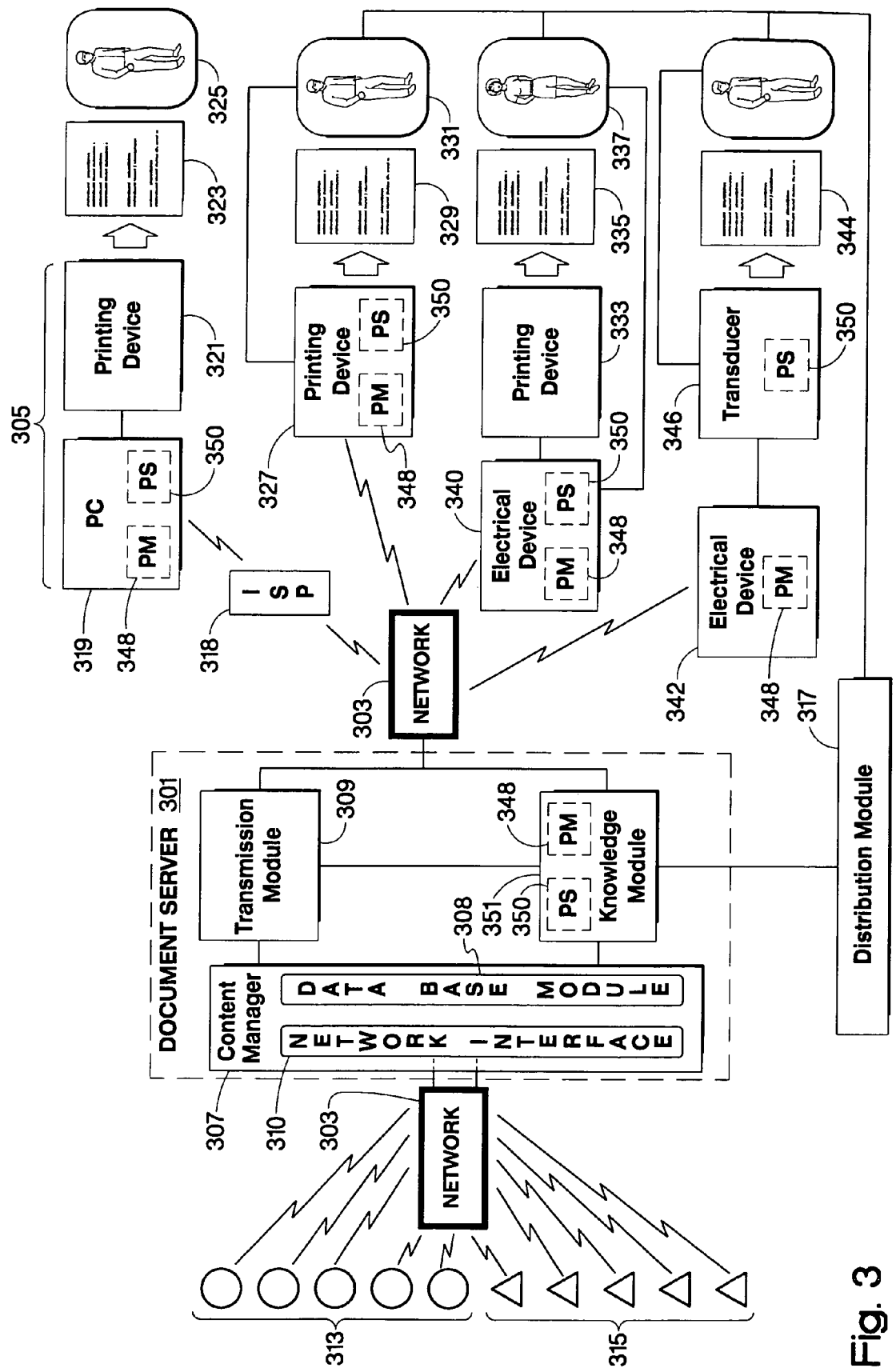
FIG. 3 is a diagram illustrating the relationship of various components of a service provider and several subscribers' terminals in a system that may employ the present invention.

A document delivery system that may be employed in the present invention is illustrated in the drawing of FIG. 3. A document server 301 is operatively coupled via a network 303 to a variety of personal computers, printing devices, and other electronic devices, collectively referred to as user terminals 305. In a preferred embodiment, document server 301 contains a content manager 307, a transmission module 309, and a knowledge module 311. Within the content manager 307 are a database module 308 and a network interface 310. The database module 308 stores a table of parameters associated with certain content providers for use in generating resource locators. The network interface 310 receives inputs from one or more syndicates and content providers 313, and/or one or more advertising providers 315. A distribution module 317 is operatively coupled to the document server 301, which in a preferred embodiment, is a minicomputer/server, such as an HP 9000 server sold by the Hewlett-Packard Company, although those skilled in the art will appreciate that document server could be any type of other computing or electronic device(s) that performs the functions described herein. The network 303 is preferably the Internet, although an intranet, local area network, or other type of public or private network, either wired (e.g., telephone, cable TV, etc) or wireless (e.g., satellite, radio, cell phone, etc), could also or additionally be used. Depending upon the nature of the network 303 and the type of service employed by the subscriber, there can be an entity, an ISP (Internet Service Provider), 318 that provides an interconnection between the subscriber and the network 303. The ISP conveys the subscriber's messages to the network 303 and conveys content assembled by the subscription provider at the document server 301 to the subscriber.

The subscriber terminals 305 are shown in FIG. 1 as being capable of being configured in a wide variety of ways. For example, a personal computer 319 is shown connected to a printing device 321, which prints a document 323 for a user 325. The personal computer 319 is shown operatively coupled to the network 303 by way of the ISP 318. An alternative device is a printing device 327, which prints document 329 for user 331, is operatively coupled to the network 303 without an intervening personal computer or other electronic device. Printing device 333, which prints document 335 for user 337, is shown connected to an electronic device 340, which could be a set top box, television set, palmtop PDA or other type of electronic device that is operatively coupled to the network 303. The printing devices shown in FIG. 3 could be printers, such as the HP DeskJet 890 printer, HP LaserJet V printer, or other models of printers manufactured by HP or others; so-called "mopiers" or other multi-function printing devices that can print, fax, scan, and/or copy, or any other device capable of transferring information to a printable media such as plain paper, specialty paper, transparencies, or other media capable of tangibly receiving such information and which can be easily carried about by the user.

While a printed, hardcopy, output is a primary means of delivering a subscriber's preferred document, other non-hardcopy but human-perceptible forms of document publication may also be employed in the present invention. An electrical device 342, operatively coupled to the network 303, will present the document 344 on a human-perceptible transducer 346, which converts the electronic version of the document into a form that can be perceived by a human. Examples of such a transducer include a video monitor, a flat panel display, an electro-acoustic transducer, and a tactile display mechanism.

Figure 4:
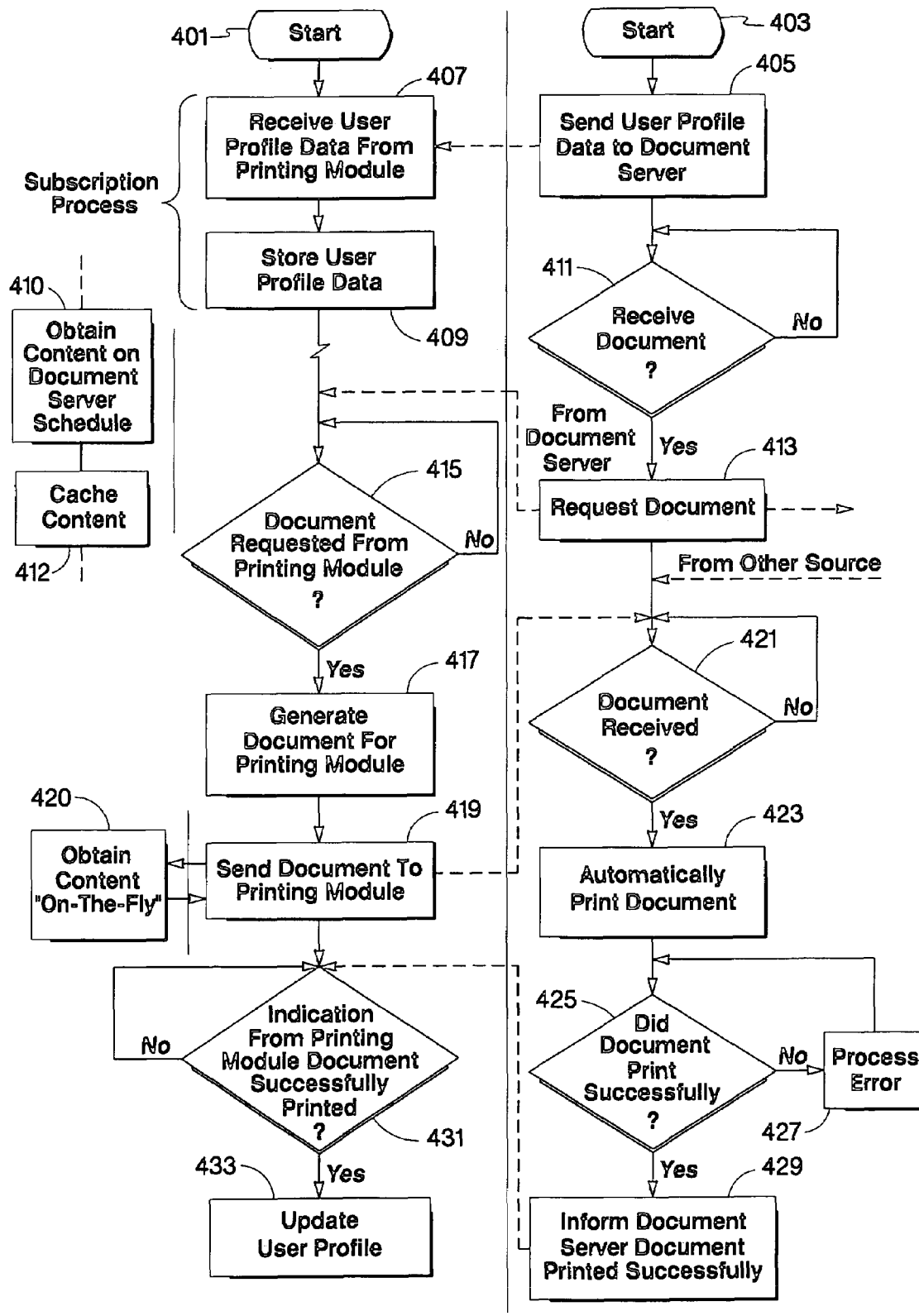
FIG. 4 is a flow chart illustrating the delivery of a requested document to a subscriber.

FIG. 4 illustrates flowcharts detailing the operation of the transmission module 309 and a printing module (PM) 348 of one embodiment of the invention. In FIG. 4, the flow diagram shown in the left column is primarily executed by the transmission module 309 of the document server 301, and the flow diagram in the right column is executed by the printing module 348. As FIG. 3 shows, the printing module 348 can be located in any of the devices 305 that are operatively coupled via the network 303 to document server 301, or it can be located within document server 301 itself, for example in a knowledge module 351. Preferably, the transmission module 309 and printing module 348 are realized as software that executes on suitably programmed microprocessor(s) within a user terminal 305 and/or document server 301, although those skilled in the art will appreciate that special purpose hardware or other mechanisms could be employed to execute the flowcharts shown in FIG. 4.

Referring now to FIG. 4, the flow diagram for the transmission module 309 starts in block 401 in the left-hand column of the figure, and the flow diagram for the printing module 348 starts in block 403 in the right-hand column of the figure. Since there is a great deal of interaction between these two functions, represented by the broken lines connecting the two columns, the operation of the two flow diagrams will be described simultaneously.

In a preferred embodiment for the subscriber's subscription process, the user profile data is sent, at block 405, to the document server 301 to be stored in the subscriber profile. This subscriber profile data can take on many different forms, from simple to very detailed. Three pieces of information are stored in the simplest subscriber profile: type of subscriber terminal, email address, and whether the subscriber can be contacted or not. A more complicated subscriber profile can include the subscriber's name, email address, company name, city, state, country, zip or postal code, phone number, printer information, areas of interest, household income, age, and sex of the subscriber, among other things. In any event, the subscriber profile data is received, in block 407. The received subscriber profile data is stored, preferably in knowledge module 351, at block 409. Alternately, the subscriber profile data could be locally stored in the subscriber's terminal 305 or in some other local or remote location.

Asynchronous to the transmission module activities, the document server obtains content and advertising information, at block 410, and caches it in the database module 308, at block 412. Further description of this process is found below.

Once a subscription is registered the remainder of the delivery process goes into a waiting mode for a particular subscriber, as represented by the receive document decision block 411. A decision whether a document should be received from the document server 301 is made by the printing module, at block 411. This determination is done by checking a print schedule (PS) 350 which is preferably stored at a user terminal 305 or document server 301, but may alternatively be stored in some other local or remote location. The printing schedule 350 preferably contains information that can be used to determine when documents should be published to the subscriber by the printing device or transducer, such as upon document creation, user requested time, lapse of specified time period, and/or occurrence of one or more external events (e.g., a stock price or index reaching a specified value, a final score of a sporting event, etc). The printing schedule 350 may be associated with an individual subscriber, a device, or a group or users and/or devices. In addition, each entry of the printing schedule 350 could result in the publication of one or more documents.

The printing module 348 monitors the printing schedule 350 to see if a document should be requested from the document server or from another source. When a document should be requested from the document server, block 411, an automatic request is made without subscriber intervention, at block 413, from the document server or from another source. Note that if printing module 348 is located at the subscriber terminal 305, the system operates in a "pull" mode—where the document is "pulled" from the document server to the user terminal 305. However, if printing module 348 is located remotely from the subscriber terminal 305, such as in the document server 301, the system operates in a "push" mode—where the document is "pushed" from the document server 301 to the subscriber terminal 305.

The transmission module 309 determines, at block 415, whether a document has been requested. When such a determination is made, the document for the requesting subscriber is generated, at block 417, at the transmission modules. The generated document is then sent, at block 419, to the printing module 348 for publication to the requesting subscriber. If content is to be obtained "on-the-fly", the content manager 307 commences this process at block 420.

The printing module 348 determines, at block 421, whether the document has been received and automatically prints or makes perceptible to the user, without subscriber intervention, at block 423. The term "without subscriber intervention" means that a human is not directly involved in the publishing operation; the document is sent automatically to the subscriber terminal 305 to be printed out or displayed to the subscriber. The subscriber does not press any "print" buttons or otherwise be directly involved in the publishing process; in fact, the subscriber may not even be present in the same room, city, state, or country as the user terminal 305 during the publishing operation. The printing or displaying operation automatically occurs in an unattended state—regardless of whether the subscriber is present or not. In addition, if the print schedule 350 is stored in a device-independent manner, such as on the document server, a travelling subscriber could "log in" to the document server and have his or her customized document sent to a subscriber terminal that is convenient to the subscriber's current location.

A check is made, at block 425, to see whether the document printed successfully. If not, error handling, such as attempting to publish the document again, notifying the subscriber that the printing device is out of paper or has some other error condition, or simply deciding not to publish the document is performed at block 427. When the document is successfully published, the document server is informed, at block 429, that the document was successfully published. The transmission module 309 waits for an indication from printing module 348 that the document did publish successfully. When such an indication is received, at block 431, the subscriber profile is updated with this information, at block 433.

Material to be published is obtained from syndicates and content providers 313. Typically, they post their material on their web sites available, usually by subscription, on the Internet. Advertising providers 315 may provide advertising material via the network either by content push or content pull. Advertising material obtained by content pull can be subject to the same difficulties as those experienced by content providers. A content manager 307, in the preferred embodiment, automatically causes the access of each of the websites and automatically downloads the content by way of the network interface 310. This content, among other things, is stored in a database module 308 portion of the content manager. The content of each provider is usually made available on a variety of different schedules, i.e., daily, weekly, every Wednesday and Friday, etc. Some content is published when it is available, not to a schedule and multiple features may be posted for the same day. Additionally, the content comes in different formats: text, tiff images, eps images, and the like. To further complicate matters, each provider uses a different naming convention for the content access path via the network. Some syndicators embed a date encoding in the path, others use it only in the filename. Moreover, the directory structure used to store the content is different for each feature.

In order to resolve these differences and provide an automated service, an association of the characteristics of each feature to construct the network address used by the content provider to post the feature on its website is made. Since the most common posting of the content is on the Internet, a Uniform Resource Locator (URL) is used to address the Internet website in the preferred embodiment. A private network may alternatively employ the present invention in the utilization of resource locators to identify addresses on the network. A feature is content that is addressed by the same name from update to update. Examples of features include a Dave Barry column, Wizard of Id comic strip, Mike Luckovich political cartoon, etc. An issue is a single instance of content for a feature, i.e. the Dave Barry column for May 14.

It is the variability of the resource locators used by each syndicator or content provider that causes significant problems in the automation of content gathering. In a preferred embodiment, the variability of the structure in the resource locators and the information needed for each feature is encoded in a number of database tables. These tables allow new features to be added to the download process without having to write any code specific to that feature.

Figure 5:
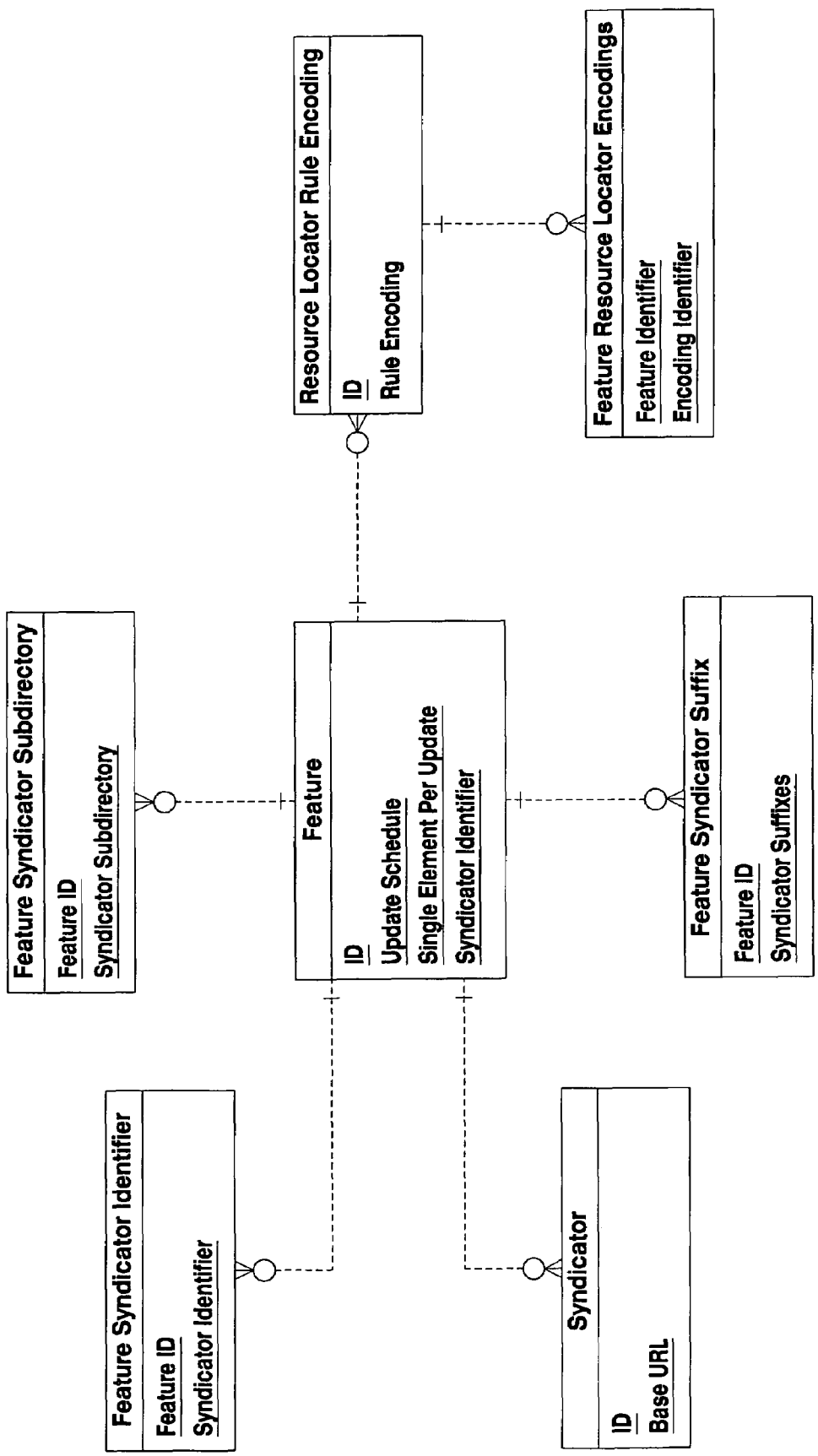
FIG. 5 is an entity relationship diagram of a plurality of parameter values for a resource locator.

In the preferred embodiment, the feature characteristics that are taken into account are: the update schedule, i.e. Monday though Saturday, Wednesdays only, Wednesdays and Fridays, irregular; if the feature can have multiple issues posted per day; content type, i.e. text, tiff images, eps images, pdf; and different naming conventions used for a feature. The entity relationship diagram of FIG. 5 shows the database tables created to support the feature resource locator construction.

The following pseudocode shows how the feature resource locators are constructed in a preferred embodiment using the entries in the database tables:

```
vector get FeatureRL (int featureid, int date, int issuecnt)
for each subdirectory the feature could be found in
{
  for each identifier the syndicator uses for the feature
  {
    for each suffix the feature could have
    {
      for each feature rl encoding
      {
        get the rl encoding rule
        expand the rule with the information for the feature
        add the expanded rl to the vector returned from this function
      }
    }
  }
}
```

An example may help clarify the process of creating a resource locator in the preferred embodiment. Assume that one or more of the syndicators/content providers uses a resource locator for its Internet website like the template shown in FIG. 6-1. In the illustrated resource locator template, six parameter slots are established in the template 601. These parameter slots are syndicator Base URL 603, Syndicator Subdirectory 605, path identifier 607, date 609, Syndicator Identifier 611, and Syndicator Suffix 613. Several templates are stored in the database module 308. Also stored in the database module 308 are the various parameter values, which are arranged by content definition (i.e. content type, content provider, etc.) An example of two syndicators and their associated parameters is shown in FIG. 6-2.

In a preferred embodiment, content is downloaded by the subscription provider at a predetermined time (for example, a network low-usage time after midnight) for all of the URLs of the content providers and advertising providers in use by the subscription provider. The URLs are generated, as described below, with sequential dates incremented from the current date to an expected last date of available publication. (It is of interest that various content providers will provide materials for publication days or weeks in advance of the publication date, but with varying times of advance). Thus, all of the content for any next publication as well as content for days or weeks in the future is downloaded from the websites of the content providers and cached in the database module 308. For each subscriber's customized publication, then, the appropriate cached content consistent with a subscriber's profile for content is recalled and assembled for delivery.

Alternatively, URLs are generated to obtain and cache content for only the publications that are being assembled for near future delivery. This "on-the-fly" content obtaining is particularly useful for late-breaking content or for specialty content subscribers having content definition in their profile that is not requested by a significant number of other subscribers.

Figure 7:
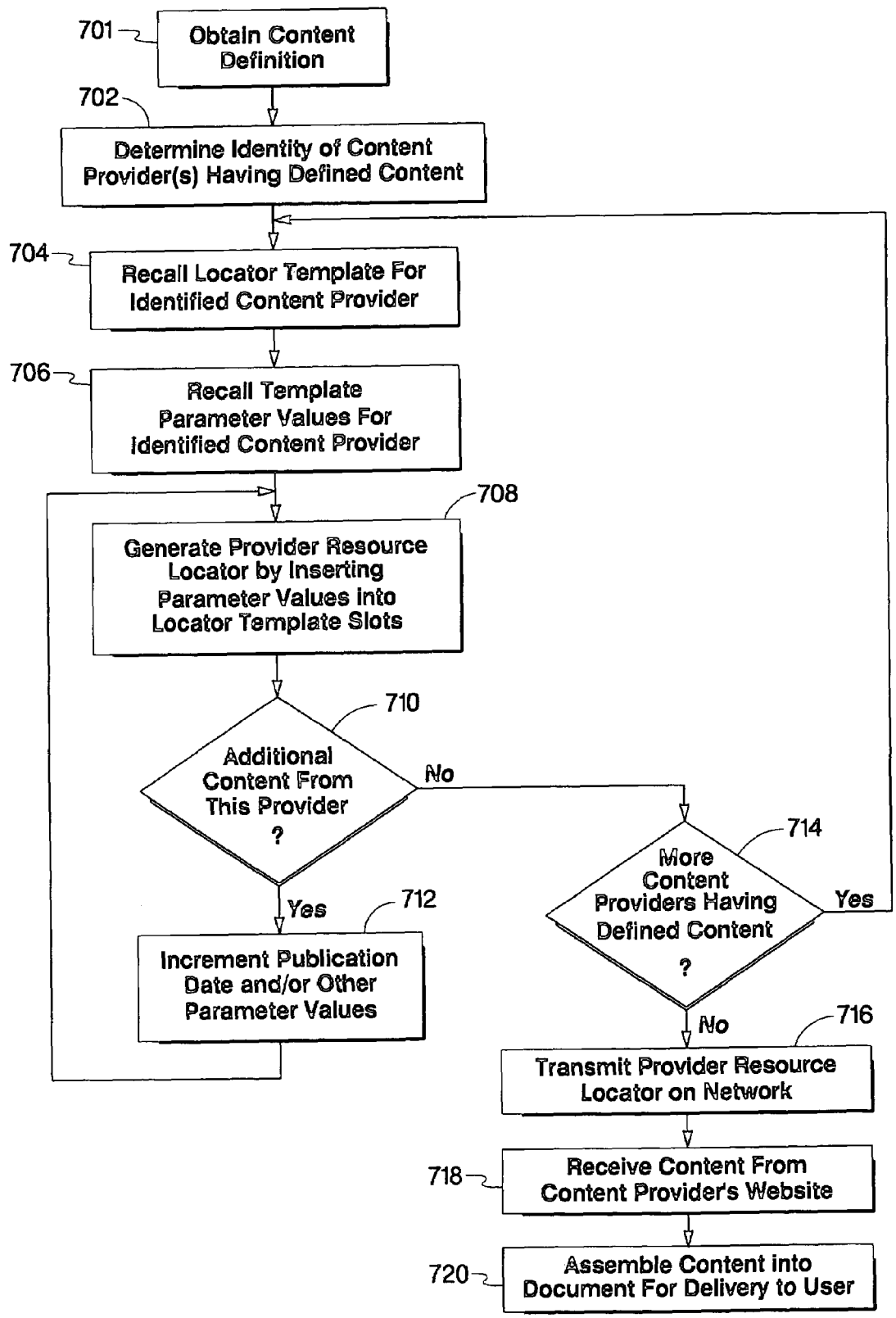
FIG. 7 is a flowchart illustrating the process of generating a resource locator and accessing content.

A flowchart illustrating the process of generating a resource locator (a URL in the preferred embodiment) is shown in FIG. 7. Content that is desired by the subscribers and defined in their subscriber profiles is obtained, at step 701, for at least the next delivery period and preferably for an extended number of delivery periods. The identity of the content provider offering the subscriber defined content is determined, at block 702, by querying the database module 308. A locator template, such as that illustrated in FIG. 6-1, is recalled, at block 704, as a template compatible with the resource locator of the identified content provider. Also, parameter values associated with the identified content provider, are recalled from memory, the database module, at block 706. The resource locator template slots are populated with the appropriate parameter values for the identified content provider, at block 708, to generate the necessary provider resource locator. A determination is then made whether additional content is available from the present content provider, at step 710. Additional content is likely to be content that is to be published at a future date but can be content from other authors or other variations of resource locator parameters (such as typographic errors). In any event, the publication date and/or the other parameters are incremented, at block 712, and the process returns to the generation of a provider resource locator at block 708. If it is determined that no additional content is available from the present content provider, a determination is made, at block 714, whether there are more content providers offering content that meets the defined content of any of the subscribers during the publication period. If more content providers were identified in block 702, the process returns to the recall locator template step of block 704. If no additional content providers are detected, the process of the preferred embodiment transmits the provider resource locators on the network, at block 716. The transmission step need not occur immediately after the last content provider's resource locator has been generated; a delay may be inserted in order that the optimum time for exchange on the network be utilized (i.e., the least busy time) or a convenient time for the subscription provider. Once a resource locator has been transmitted on the network, content is returned from the accessed content provider's webpage, at step 718. The transmission and reception steps may occur serially, in parallel, or a combination of the two. The returned content is then stored, under a convenient name, in the database module 308.

In the preferred embodiment, specified content stored in the database module is recalled in accordance with a particular subscriber's profile and assembled into the customized document for delivery to the subscriber. A process similar to that shown in FIG. 7 is used for on-the-fly publications but the content definition is usually limited to that of one or a few like subscribers and the parameter values are typically limited.

It should be noted that the content provider may be inconsistent in its use of terminology for its resource locator, or a typographical error may make content unavailable for one publishing period. A feature of the present invention allows common errors to be accommodated by merely including the common error as one of the parameter values. For example, a content provider that inconsistently uses .tif and .tiff as the syndicator suffix can easily be accommodated when both forms are placed in the parameter values storage. Creation of the resource locator for this content provider is, in fact, a creation of two resource locators, one using .tif and one using .tiff. Depending upon the content provider's spelling, content is downloaded from one website. Similar variation can be introduced into any of the parameter values (or removed from any of the parameter values) as the service provider sees fit.

Once the content is downloaded, the subscription provider employing the present invention can rename the content with a definitive filename. Since the downloading process is automated, there is a finite probability that some of the expected downloaded content will be missing. By building the filenames to include content definition and timeliness, missing content feeds can automatically be detected and reported to human supervisors. In a preferred embodiment, the filename for storage is generated as {mmdd} {xxx}.gif, where mmdd=date of content provider's expected publication and xxx=subscription provider's code for the content definition.

When the subscriber's document is to be assembled the content definition and the expected publication date are automatically compared to the subscriber's profile list of desired content and to the current publication date. When the filename is missing, a human supervisor is notified that a particular feature is missing. The human can then determine a reason for the missing feature and take corrective action. In this way, only the documents having missing features require human intervention, rather than all documents.

Thus, a process that automatically obtains content for a plurality of unique subscribers having unique requirements for their customized publication has been realized as described in a preferred embodiment. A rule-based process of content provider resource locator generation enables the use of a finite number of resource locator templates—generally fewer in number than the number of content providers and routinely fewer than the number of content authors.

We claim:

1. A method of assembling content from content providers, the content providers having the content available on a network, for delivery from a document server to a subscriber's terminal, comprising the steps of:

obtaining a subscriber's content definition;

defining a locator template having a plurality of parameter slots and being compatible with a resource locator of a content provider having content meeting said content definition;

recalling stored parameter values and inserting said parameter values in said parameter slots to create a provider resource locator;

transmitting said provider resource locator on the network;

receiving content from said content provider in response to said transmission of said provider resource locator; and assembling at least said received content for delivery from the document server to the subscriber's terminal.

2. A method of assembling content in accordance with the method of claim 1 further comprising the step of storing said received content.

3. A method of assembling content in accordance with the method of claim 2 further comprising the steps of:

when said content is received, assigning said received content a storage name, said storage name including a current date code and a content definition code; and confirming the existence of said storage name when at least said content is to be assembled, thereby identifying missing content.

4. A method of assembling content in accordance with the method of claim 1 wherein the step of recalling stored parameter values further comprises the step of recalling stored parameter values that are stored in an association with at least part of said content definition.

5. A method of assembling content in accordance with the method of claim 1 wherein one of said stored parameters is a publication date, the method further comprising the step of incrementing said publication date by a predetermined time to create a second provider resource locator.

6. A method of assembling content in accordance with the method of claim 1 further comprising the step of varying a parameter value to account for predictable errors of said parameter value to create another provider resource locator.

7. A method of assembling content in accordance with the method of claim 1 further comprising the step of delivering said assembled content to the subscriber's terminal.

8. A method of assembling content in accordance with the method of claim 1 further comprising the step of conveying said assembled content to the subscriber's terminal.

9. A method of assembling content in accordance with the method of claim 1 wherein said step of obtaining a subscriber's content definition further comprises the step of recalling a subscriber profile.

10. A method of assembling content in accordance with the method of claim 9 further comprising the step of scheduling delivery of said assembled content at a time in accordance with said subscriber profile.

11. A method of assembling content in accordance with the method of claim 9 further comprising the steps of ascertaining subscriber advertising information preference and further to said assembling step, assembling said preferred advertising information with said received content.

12. A document server that assembles content from content providers that offer content on a network for delivery to a subscriber's terminal, comprising:

a knowledge module storing a subscriber's content definition;

a locator template that has a plurality of parameter slots and is compatible with a resource locator of a selected content provider that offers content meeting said content definition;

a database module that stores parameter values associated with said selected content provider and content received from content providers;

a content manager that recalls said stored parameter values from said database module, inserts said recalled parameter values in said parameter slots to create a provider resource locator, accepts content from said selected content provider and assembles content from said selected content provider for delivery to the subscriber's terminal; and a network interface that transmits said provider resource locator on said network to obtain content from said selected content provider.

13. A method of assembling content from content providers, which have the content available on a network, for delivery from a document server to a subscriber's terminal, comprising the steps of:

accepting a subscriber's profile including at least first and second preferred definitions of content;

defining first and second locator templates having a plurality of defined parameter slots and being compatible with first and second resource locators of a first content provider providing content meeting said first preferred definition and a second content provider providing and content meeting said second preferred content, respectively;

storing predetermined parameter values in an association with each of said first and second preferred definitions of content;

recalling said predetermined parameter values for said first preferred definition of content, thereby identifying first values, and inserting said first values in said defined parameter slots of said first locator template to create a first content provider resource locator;

recalling said predetermined parameter values for said second preferred definition of content, thereby identifying second values, and inserting said second values in said defined parameter slots of said second locator template to create a second content provider resource locator;

transmitting said first content provider resource locator on the network;

transmitting said second content provider resource locator on the network;

receiving first content from said first content provider in response to said transmission of said first content provider resource locator and receiving second content from said second content provider in response to said transmission of said second content provider resource locator; and assembling said first content and said second content for delivery from the document server to said subscriber.

14. A method of assembling content in accordance with the method of claim 13 further comprising the steps of:

when said first content is received, assigning said received first content a first storage name, said first storage name including a current date code and a first content definition code;

when said second content is received, assigning said received second content a second storage name, said second storage name including said current date code and a second content definition code; and confirming the existence of said first storage name and confirming the existence of said second storage name when said first and second content is to be assembled, thereby identifying missing content.

15. A method of assembling content in accordance with the method of claim 1 wherein the step of recalling stored parameter values further comprises the step of recalling stored parameter values and inserting said parameter values in said parameter slots to create a uniform resource locator (URL) as a provider resource locator.

* * * * *